Figure 1:
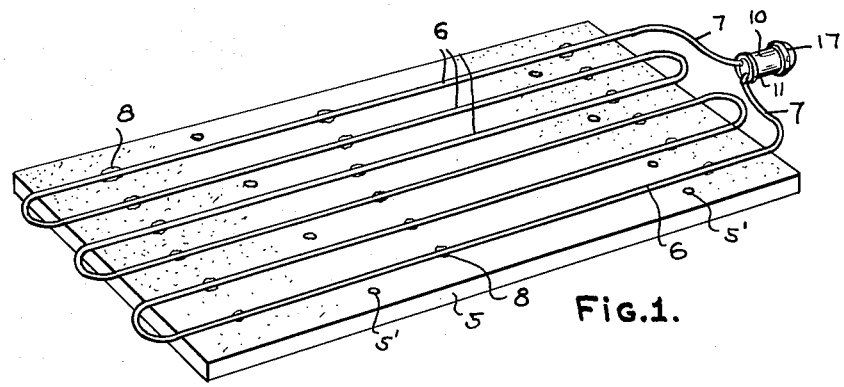

Oct. 24, 1961     F. W. JAMISON     3,005,895

HEATED MASTIC SLAB

Filed April 8, 1960     2 Sheets-Sheet 1

INVENTOR.
FREDERICK W. JAMISON,
BY
ATTORNEY

Oct. 24, 1961 F. W. JAMISON 3,005,895
HEATED MASTIC SLAB
Filed April 8, 1960 2 Sheets-Sheet 2

INVENTOR.
FREDERICK W. JAMISON,
BY
ATTORNEY

United States Patent Office 3,005,895
Patented Oct. 24, 1961

3,005,895
HEATED MASTIC SLAB
Frederick W. Jamison, Fort Lauderdale, Fla.
(1189 Colgate Drive, Pitcairn, Pa.)
Filed Apr. 8, 1960, Ser. No. 20,916
1 Claim. (Cl. 219—19)

This invention relates to heated mastic panels of the type that is molded from a suitable mastic, such as concrete and that has embedded therein a heat dispensing unit whereby to direct heat to the upper surface of the panel as a means to prevent the accumulation of snow and ice.

In the northern sections of the country, during the winter months, it has been extremely difficult to maintain walkways, steps and driveways free of ice and snow accumulations that have proven highly dangerous and has necessitated considerable manual labor in maintaining the walkways, steps, etc. free from such accumulations to remove the hazardous conditions. The purpose of this invention is to provide molded panels having heater elements embedded therein that are dimensioned to form individual steps and a continuous walkway or driveway with the panels of the walkways being in parallel abutting relation or possibly slightly spaced apart and with novel connecting neans for the several panels with respect to a source of electrical energy that is simple in construction and whereby the several panels may be connected to the source of energy in a parallel manner, without the use of individual junction boxes for each panel or step so that the entire group of panels may be installed and two lead wires from the source of energy being threaded through the connectors of the several panels to form self-connectors, resulting in a very simple and economical method of assembly.

The invention contemplates an insulating panel that is provided with a heating coil disposed upon one side and with the heating coil being initially bonded to the upper surface of the panel at spaced apart points so that the panel can be disposed in a mold of mastic material and with the mastic material fully covering the panel both above and below and with the coils being jointly connected at one end with a novel form of self-connecting plug having a portion thereof embedded into the end of the panel and with the plug projecting beyond the panel at its end portion to constitute the connecting means for the conductors of the source of electrical energy.

The invention further contemplates a novel form of heated panel wherein a coil of heater wire is disposed upon an insulating panel in a manner whereby the heat from the coil is directed upwardly to the surface of the panel and insulated against downward dissipation of the heat from the coil.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

Figure 2:
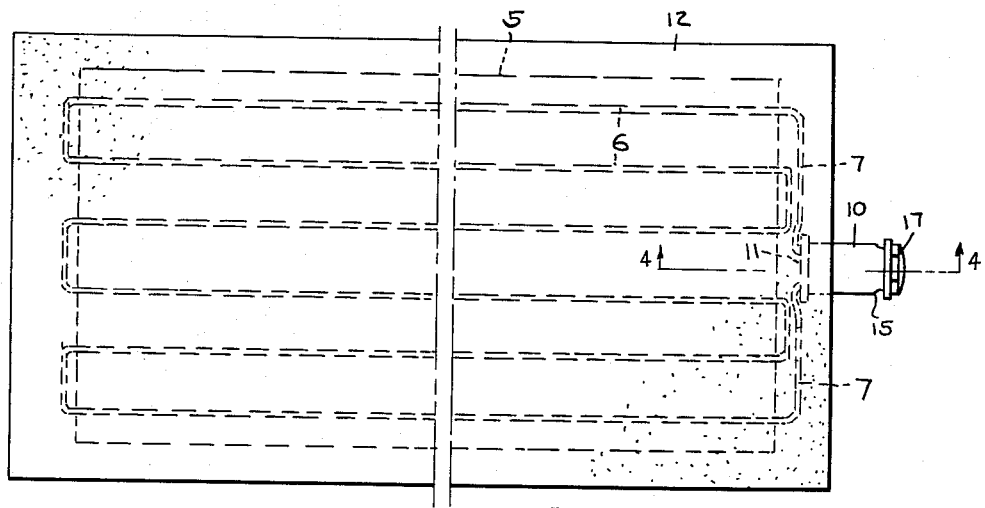
Figure 3:
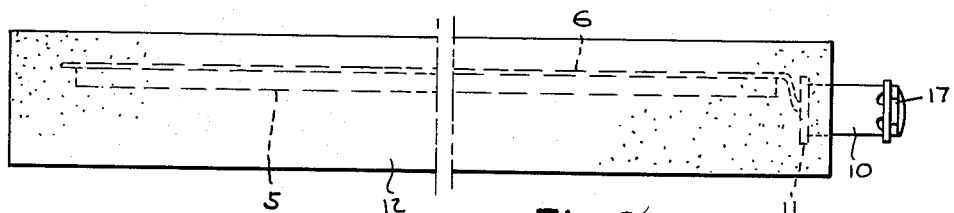
Figure 4:
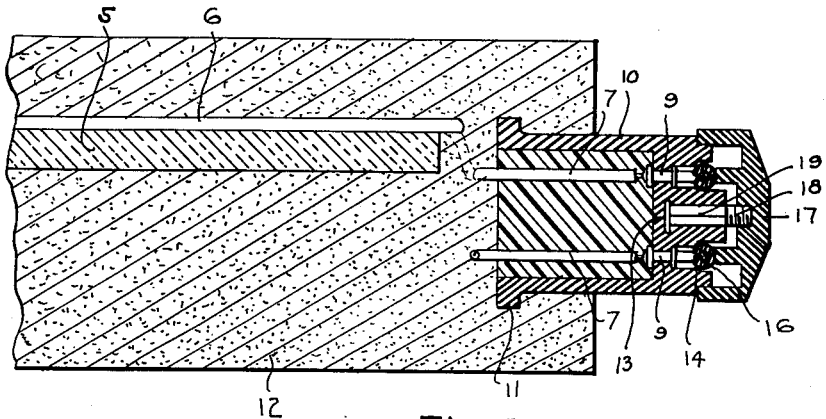
Figure 5:
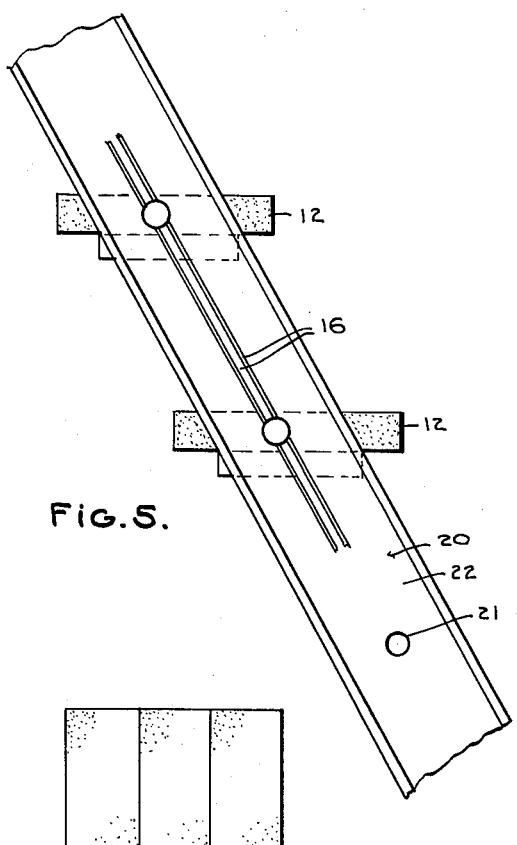
Figure 6:
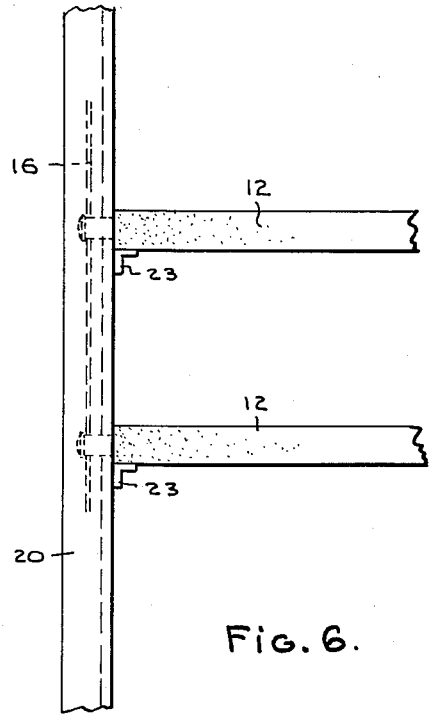
Figure 7:
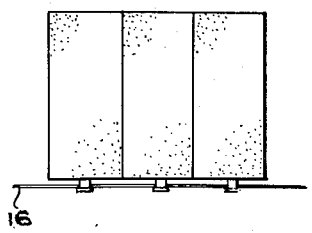

In the drawings:

FIGURE 1 is a perspective view of an insulating panel showing the heating coils initially bonded thereto and with the terminal ends of the coil being connected to a self-connecting plug, FIGURE 2 is a plan view on an enlarged scale, FIGURE 3 is an edge view of the completed panel, FIGURE 4 is an enlarged fragmentary longitudinal section taken substantially on line 4—4 of FIGURE 2, FIGURE 5 is a fragmetary view illustrating the assembly of the panels to form a group of steps, FIGURE 6 is a front view of the structure of FIGURE 5 and, FIGURE 7 is a fragmentary plan view upon a reduced scale showing several panels disposed to form a walkway.

Referring specifically to the drawings and particularly FIGURE 1, there has been illustrated a generally rectangular panel board 5, formed of asbestos or similar insulating material. The board 5 is perforated at 5' for bonding relation to a mastic body, to be described. Disposed upon the surface of the board 5 are a plurality of flights 6 of a continuous coil of heater wire, having terminal ends 7, leading from one end of the board 5. The coils 6 are initially connected with the upper surface of the board 5 at spaced apart points, by suitable spots of mastic adhesive 8 whereby the coils are retained initially in their spaced apart and parallel relation. The heater element embodying the board 5 and the coil 6 may be initially supported within a suitable threading frame having pegs or the like about which the coils may be wrapped and the coils are then secured initially to the upper surface of spots of board 5 by the adhesive 8 so that the entire assembly may be lifted from the frame for disposition into a separate molding frame, not illustrated, for completely enclosing or embedding the panel 5 in mastic cement or possibly plastics. Each of the leads 7 from the coils 6 are soldered or otherwise connected to metallic pins 9, formed in a suitable hard rubber or plastic shell 10. The shell 10 is provided with an enlarged collar 11 at one end whereby the shell may be molded into a plastic body 12, of cement or other suitable materials.

The pins 9 and the shell 10 are of conventional construction, commonly recognized as a self-connecting connector device and the pins 9 project beyond a partition 13, where they have their outer end portions sharpened, as indicated at 14. The outer end portion of the shell 10 is provided with a pair of spaced apart grooves 15, receiving electrical conductor wires 16. The conductor wires 16 are extended through the grooves 15 and forced into connecting engagement with the points 14 by a cap member 17, that has threaded engagement at 18 with a non-rotatable shaft 19 that is molded into the partition 13. Movement of the cap 17 forces the wires 16 into engagement with the points 14 so that the points will have electrical connection with the conductors. The connector thus furnishes a substantially water-proof connector means between the source of electrical energy in the form of the wires 16, with the leads 7 of the coil 6. After the leads 7 have been connected to the pins 9, the cavity of the shell 10 is then filled with a suitable insulating material, such as epoxy resin, bonding the leads 7 against displacement and insulating the leads with respect to the pins 9.

After the leads 7 have been suitably connected with the connector shell 10, the entire assembly of the insulating panel 5, carrying the coils 6 are supported in a suitable frame and cement poured therein to completely embed the panel 5 and its coils and to embed the end portion of the shell 5 carrying the collar 11. The panel 5 and the connector are supported in any suitable manner from the bottom of the mold so that the panel 5 is relatively closer to the upper surface of the finished panel 12, with the shell 10 extending outwardly from one end of the panel. The mold may be provided with a suitable aperture whereby to position the connector and to determine the degree of embedment into the panel 12 so that the connector will extend beyond the end of the panel a predetermined distance. After the cement has been hardened, the panel is removed from the mold, carrying with it the shell 10 and as such, constitutes a unitary structure that may be employed as individual steps or, the panels 12 may be disposed in parallel edge to edge relation to form a continuous walkway, such as that illustrated in FIGURE 7. It may be found desirable that the cement in the mold be terminated substantially level with the insulating panel 5 and then the upper surface of the panel 12 covered by ceramic tiles or similar colored mastic where other than a conventional concrete finish may be desired.

In FIGURES 5 and 6, there has been illustrated a means for forming steps, comprising a plurality of the panels 12. The panels 12 may be supported between a pair of parallel channel irons 20 that form the sides of the steps and the channels 20 are provided with apertures 21 at predetermined spaced points for the passage of the connectors 10 so that the connectors project outwardly of the web portion 22 of the channels 20. Each of the panels 12 forming the steps are preferably supported at the end portions by angle irons 23, that are riveted or bolted to the web 12 and that constitutes the rest against twisting or downward movement of the panels 12.

In the use of the device, the panels 12 in their assembled or molded construction are produced and sold as a unitary structure, with each panel 12 having its individual connector for the conductors 16. When the panels 12 are assembled into a walkway, they are supported against downward movement by any desirable footing or the like so that they will remain substantially horizontal. With the several panels 12 arranged as a walkway, the several caps 17 of the connectors are removed and conductor wires form a source of electrical energy are threaded through the grooves 15 and the caps then replaced and forced against the wires 16, to create an electrical connection with the pins 9 and when fully seated, the caps 17 constitute a water-tight electrical connection for the several panels and their coils 6. In the use of the panels 12 as steps, the wires 16 are threaded through the several connectors and the caps 17 employed to electrically connect the wires with the pins 9. The several connectors and the wires 16 of the steps may be covered by a suitable channel element as an additional safeguard against unauthorized removal of the caps 17 and to improve the appearance of the structure generally.

It will be apparent from the foregoing that a very novel form of heater panel has been porvided. The heater coils 6 are disposed adjacent the upper surface of the panel 12 and, since the major degree of heat will be directed upwardly to the surface of the panel and relatively little heat will be dissipated downwardly. The device may be formed in various dimensions and constitutes elements that are easily assembled into conventional steps or walkways or the like and the several panels electrically connected in a very simple manner.

It is to be understood that the invention is not limited to the percise construction shown, but that changes are contemplated as readily fall within the spirit of the invention as shall be determined by the scope of the subjoined claim.

Having described my invention, what I claim as new and desire to secure by Letters Patent is:

A heated mastic slab for use in forming steps, walkways, driveways and other weight bearing surfaces to prevent the accumulation of ice and snow upon the surfaces of the slab, comprising a molded rectangular body of concrete, a heater element disposed in the body to be parallel and spaced with respect to the upper and lower surfaces of the slab, the heater element comprising a sheet of relatively rigid insulation material having a multiplicity of heat radiating electrical conductors disposed upon its upper surface, the conductors being one continuous wire having its terminal ends terminating at the same end, the conductors being parallel and equidistantly spaced apart, the terminal ends of the conductor being fixed in electrical connection with a self connecting plug for connection with a source of electrical energy, the said plug being partially embedded in the concrete of the slab for self connection to conductors from the source of energy, the said slabs being arranged in parallel relation to form the steps, walkways or the like and with a single pair of conductor wires from the source of energy connecting the several slabs in parallel, the sheet of insulation and its supported heat radiating conductors being molded into the slab with the sheet being relatively close to the upper surface of the slab whereby the major amount of radiated heat will be directed to the bearing surface and with the sheet very substantially retarding downward dissipation of the heat, the said conductors being assembled with respect to the insulation material by initially uniting the several flights of the conductors to the surface of the insulating material by spot adhesives, maintaining the several flights of the conductors in accurate spaced apart parallel relation.

References Cited in the file of this patent
UNITED STATES PATENTS

| | | |
|---|---|---|
| 2,138,217 | Sutter | Nov. 29, 1938 |
| 2,159,064 | Walter | May 23, 1939 |
| 2,685,021 | Duncan | July 27, 1954 |
| 2,751,568 | Despard | June 19, 1956 |
| 2,844,696 | Custer | July 22, 1958 |
| 2,912,555 | Jamison | Nov. 10, 1959 |